FIG I

INVENTORS
CAMERON B. SATTERTHWAITE
ROGER P. RIES

BY Merriam, Marshall, Shapiro, & Klose ATTORNEYS

INVENTORS
CAMERON B. SATTERTHWAITE
ROGER P. RIES

BY Merriam, Marshall, Shapiro, & Klose

United States Patent Office 3,479,576
Patented Nov. 18, 1969

3,479,576

SUPERCONDUCTING AMPLIFIER

Cameron B. Satterthwaite and Roger P. Ries, Urbana, Ill., assignors to University of Illinois Foundation, Urbana, Ill., a corporation of Illinois Filed Jan. 20, 1966, Ser. No. 521,934
Int. Cl. H03f *19/00*
U.S. Cl. 321—8 6 Claims

ABSTRACT OF THE DISCLOSURE

A superconducting amplifier for transforming a low level input signal into an amplified alternating output signal including a coaxially wound solenoid, the coils each formed of superconducting wire and disposed in close inductive coupling with the low level input signal being applied to one of the solenoid coils, and a vibrating mechanism for vibrating one of the coils with respect to the other so as to cause a periodic variation in the mutual inductance coupling the input and output coils to provide an amplified alternating output signal in the output coil having an amplitude corresponding to the level of the input signal, the combination enabling the amplification of input signals in the picovolt region.

This invention relates to direct current amplifiers and more particularly to an amplifier utilizing superconductive principles and a time varying inductance provided by the relative movement of mutually coupled input and output coils to produce frequency conversion and power amplification of an input signal.

The present invention is particularly applicable to the measurement of voltages of the order of picovolts ($10^{-12}$ volts) or less in low impedance circuits. These low voltages are encountered for example in studies concerning the changes in resistance in or near the transition region of superconductors; in studies concerning thermoelectric phenomena; and in studies concerned with investigation of the Hall effect. Because of the extremely low level of the voltage to be measured in these and similar circumstances, one must employ measuring devices having high sensitivity and low noise level such that the input signal can be properly detected. Measuring devices currently available under such conditions involve sensitive galvanometers or devices utilizing chopper amplifiers in well known arrangements. With these instruments it is possible to measure voltages in the range of $10^{-11}$ to $10^{-12}$ volts.

According to the principles of the present invention a pair of inductively coupled coils formed of superconducting material are driven in relative motion to each other so as to derive a variation in the mutual coupling between the coils. By coupling the input signal to one of the coils, an amplified alternating current output can be obtained from the other coil having an amplitude corresponding to the level of the input signal. In the preferred embodiment of the invention a pair of tightly coupled coaxially wound solenoids are utilized in which one of the solenoids is vibrated relative to the other to produce the desired time variation in the mutual inductance. By utilizing the principles of the invention the measurement of voltages as low as approximately $10^{-13}$ volts has been obtained. The invention will be better understood from the following detailed description thereof taken in conjunction with the accompanying drawings in which:

Figure 1:
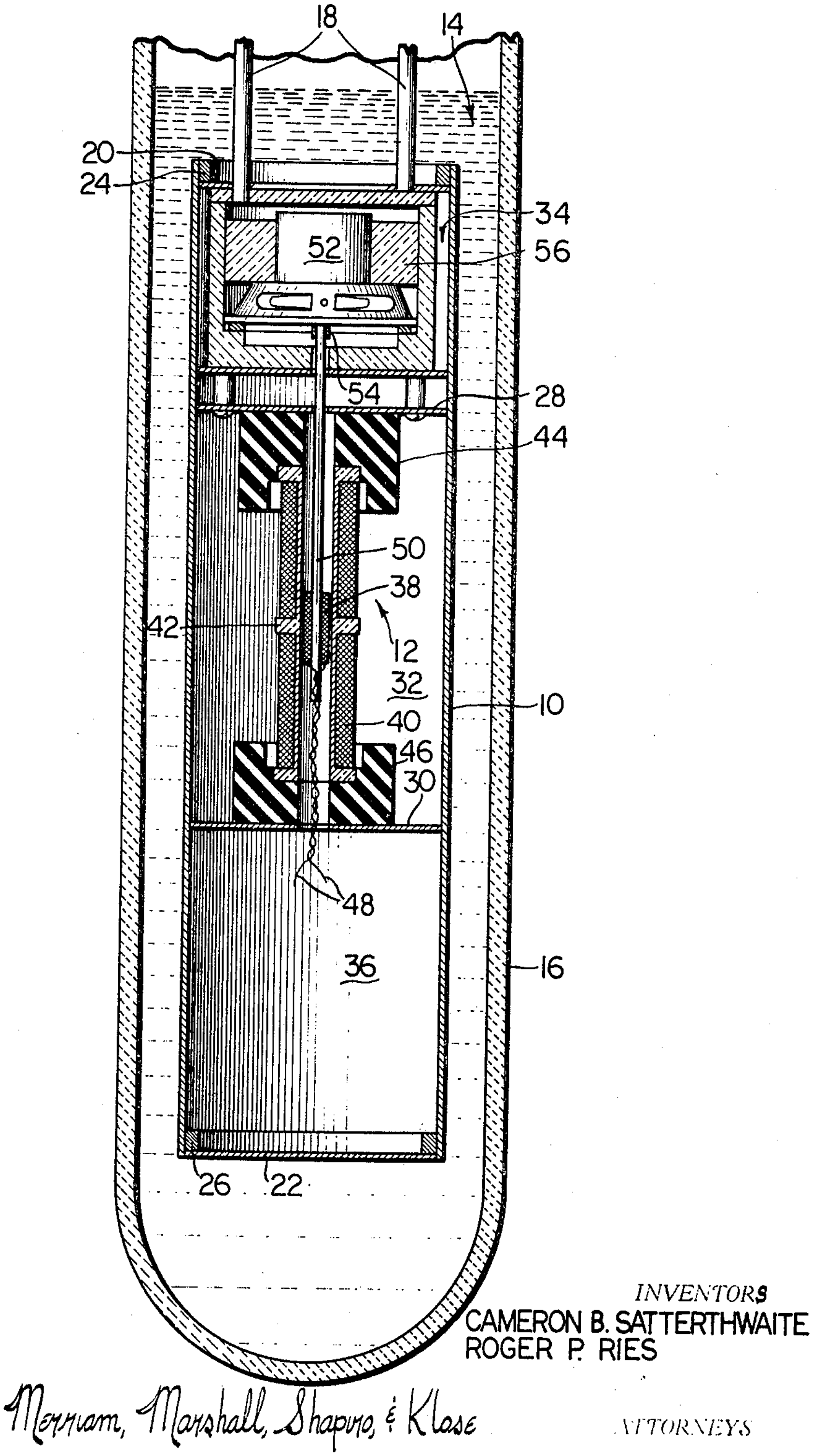
FIGURE 1 is a sectional view illustrating a superconducting amplifier constructed in accordance with the principles of the present invention.

Referring now to FIGURE 1 there is illustrated a superconducting DC parametric amplifier constructed in accordance with the principles of the present invention and which includes a metal shield can 10 formed at least in part of superconducting material and serving as a magnetic shield of the amplifier components 12 located inside the can. According to well known cryogenic or superconducting techniques the can 10 is immersed in a liquid helium bath 14 contained within a dewar flask 16. Suitable support tubes 18 are provided for supporting and maintaining the can 10 within the helium bath. The contents of the shield can 10 are maintained at a low temperature by a small quantity of gaseous helium which services as an exchange gas in the can. To prevent the liquid helium 14 from entering into the shield can 10 there is provided at pair of cover plates 20 and 22 and corresponding flange pieces 24 and 26 respectively at each end of the shield can 10.

The space within the shield can 10 is divided by partition shield plates 28 and 30 into three separate compartments: a coil compartment 32; an upper driving compartment 34; and a lower input circuit compartment 36. The shield partition walls 28 and 30 are formed at least in part of superconductive material so as to shield the inner coil compartment 32 from extraneous undesired magnetic fields.

Within the coil compartment 32 there is located a pair of coaxial solenoid coils 38 and 40. The solenoid coil 40 forms the output coil and is constructed of two sections of wound superconducting wire inter-connected such that their respective output voltages add. The coil 40 is wound on a coil form 42 which is mounted between a pair of support members 44 and 46 suitably secured respectively to the partition walls 28 and 30. An output lead (not shown) passes through the partition wall 28 into the upper driving compartment 34 and through one of the support tubes 18 to suitable detection equipment.

The input coil 38 contains fewer windings than the output coil 40 and is also wound with superconducting wire terminating in a pair of input terminals 48 which are passed through the support member 46 into the lower input circuit compartment 36. The input coil 38 is wound around an insulating Pyrex glass rod 50 which passes from the coil compartment 32 through the partition wall 28 and into the upper driving compartment 34 so as to be suspended from a speaker 52 by a brass collar 54 suitably connected to the speaker cone immediately below the speaker pole piece and voice coil. The speaker voice leads are coupled from the upper driving compartment 34 through one of the support tubes 18 and thence to a source of driving voltage. Thus, by presenting a suitable oscillating voltage to the speaker voice coil, the speaker cone will be set in motion or vibrated so as to drive the coupled glass rod 50 and the attached input coil 38 in a vibratory manner inside the output coil 40. For maximum efficiency the oscillating voltage should be operated at the approximate mechanical resonance frequency of the speaker and coil assembly, which has been determined to be normally between 300 to 600 c.p.s. It may be particularly noted that by employing the coaxially wound solenoids 38 and 40, the inductive coupling provided between the input and output coils is very strong and close to enhance the sensitivity of the present device.

Within the upper driving compartment 34 the speaker 52 is sufficiently surrounded with a magnetic shielding 56 including high permeability shields and also superconducting shields to prevent the magnetic fields produced by the speaker permanent magnet and the speaker voice coil from entering into the coil compartment 32 which, of course, would lower the sensitvity and result in erroneous indications.

Further contribution to the high sensitivity produced by the apparatus shown in FIGURE 1 is attained by virtue of the reduced susceptibility of the input and output coils 38 and 40 to residual magnetic fields. For instance, in the apparatus shown in FIGURE 1 a residual field transverse to the axis of the solenoids would result in a minimal signal due primarily to spurious vibrations of the output coil. With the output coil composed of a matched pair of solenoids connected in opposition as employed in this embodiment, this effect should be essentially zero. Furthermore, in a uniform axial magnetic field the only effect on the device shown in FIGURE 1 is that resulting from the diamagnetism of the input coil windings. The diamagnetic effect is minimized in the device by making the volume occupied by the input coil windings as small as possible, that is, using very fine wire. In fact, as an alternative embodiment by utilizing presently known thin film techniques, a thin film input coil can be formed so as to reduce this effect even further.

In operation, the input circuit to be measured is placed within the lower compartment 36 with the input signal suitably connected to the input terminals 48 producing a current in the input coil 38 and a corresponding magnetic field which is tightly coupled to the output coil 40. The input coil 38 is, of course, being vibrated relative to the output coil 40 by a suitably applied vibrating signal to the speaker 52. This produces a periodic variation in the mutual inductance coupling the input coil 38 and output coil 40 so as to provide frequency conversion and power amplification of the input signal on terminals 48 which is coupled from the output coil 40 to a suitable detector circuit.

Figure 2:
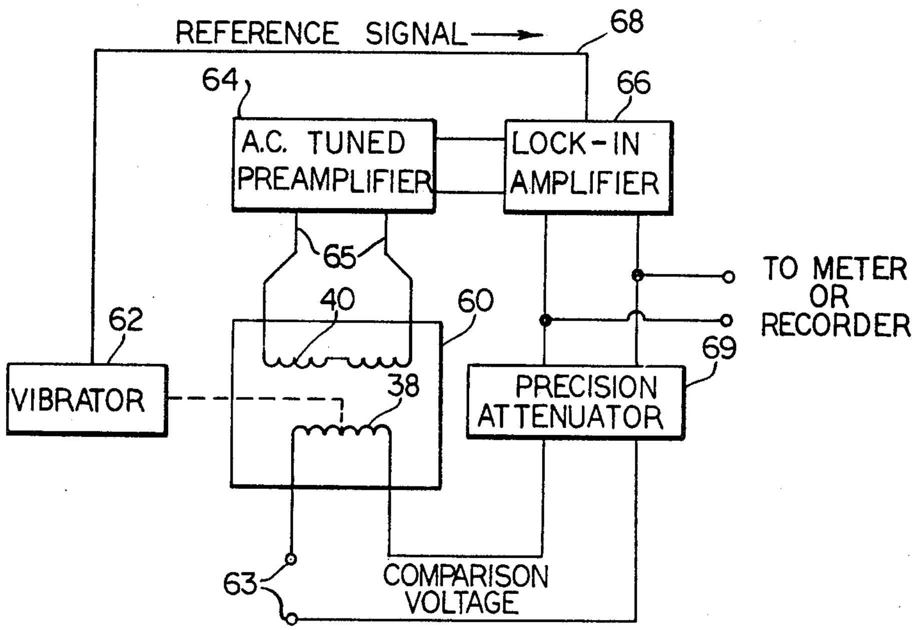
FIGURE 2 is a schematic illustration of a picovolt meter utilizing the principles of this invention.

Referring now to FIGURE 2 there is illustrated an example of a picovolt meter utilizing the output of the apparatus shown in FIGURE 1. Within a superconducting and magnetically shielded enclosure 60, there is located the input coil 38 and the output coil 40. Vibrating means 62 such as the apparatus shown in FIGURE 1 vibrates the input coil 38 relative to the output coil 40 to enable an input signal applied to the input terminals 63 to be coupled and amplified at the output portion 65 of the output coil 40. The output of the coil 40 is proportional to the DC current in the input coil 38, and to the amplitude and the frequency of vibration of the vibrator 62. An AC tuned pre-amplifier 64 is provided for amplification of the output signal from the coil 40 which is then applied to a lock-in detector amplifier 66. The lock-in detector amplifier 66 compares the output signal from the tuned pre-amplifier 64 with a reference signal from the vibrator 66. Such a detector amplifier 66 is of the well known type which detects only a signal having the frequency and phase corresponding to a reference signal, which in this instance is the vibrator reference signal supplied on line 68. The output of the lock-in detector amplifier 66 can be applied to a meter or a recorder in a well known manner. Further, by supplying a calibrated voltage, possibly derived from the lock-in detector amplifier output through well-known feedback techniques, the apparatus shown in FIGURE 2 provides a high performance picovolt meter operating in a null detecting arrangement. Referring to FIGURE 2 a comparison voltage from the output of the detector-amplifier 60 is attenuated by a factor of, for instance, $10^{12}$ by a precision attenuator 69 so that the attenuated voltage is equal to the input voltage to within the sensitivity of the superconducting amplifier. The voltage read on the meter or recorder is then a direct reading of the input voltage in picovolts.

As an example of the results obtainable according to the teachings of the present invention, a device similar to that shown in FIGURE 1 was constructed having the following characteristics. The input coil was wound of 500 turns of 0.002 inch niobium wire with the over-all dimension being approximately one-half inch long and about 0.1 inch in diameter. The output coil was formed of two sections, each one inch long and containing approximately 8500 turns of the same diameter niobium wire. A small tuning capacitor was connected across the output coil 40 so as to improve the gain of the device by resonating the output circuit. The entire assembly was housed in a cylindrical can two inches in diameter and eight inches long, which also contained the speaker 52, the lower input circuit compartment 36, and appropriate electrical and magnetic shielding. As illustrated in FIGURE 1 the can was immersed in liquid helium and the contents of the can maintained at a suitable low temperature by a small quantity of gaseous helium. This initial version of the constructed amplifier according to the teachings of the present invention operated at a sensitivity of $2\times10^{-13}$ volts. This sensitivity figure should not be taken in any way as a lower limit of the capabilities of this device since in principle the device is capable of sensitivity approaching a theoretical maximum set by the thermal noise level of the voltage source. With various refinement in shielding and coil design 10 to 100 times better sensitivity should be obtainable.

Figure 3:
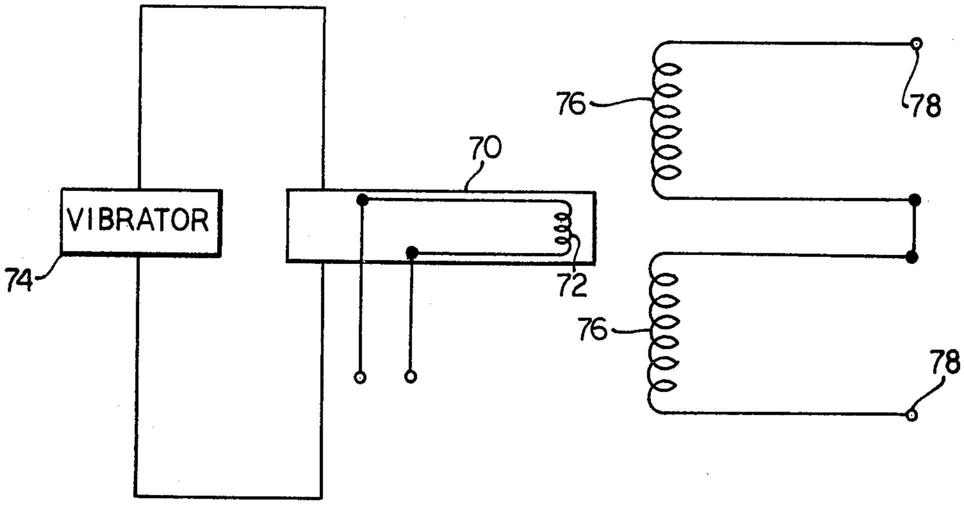
FIGURE 3 is a schematic illustration of an alternative embodiment incorporating electromechanical transducers such as a piezoelectric bimorph to vary the mutual inductance.

Possible variations in the device include other vibrating mechanisms such as piezoelectric or magnetostrictive drivers and other coil geometries. Referring now to FIGURE 3 there is illustrated an alternative vibrating mechanism which includes a piezoelectric bimorph 70 having a thin film input coil 72 suitably placed thereon such as by a depositing technique. Piezoelectric bimorphs are well known electromechanical transducer devices which deflect or bend in accordance with applied voltages across the bimorph. In the alternative embodiment illustrated in FIGURE 3, an alternating current driver circuit or vibrator 74 is applied across the bimorph so as to vibrate the bimorph and thus move the input coil. The piezoelectric bimorph 70 and the input coil 72 are located so as to be tightly coupled to an output coil 76 such that an amplified signal is provided on output terminals 78. It is understood, of course, that suitable superconducting techniques can be utilized with the apparatus shown in FIGURE 3 so as to provide a highly sensitive device in accordance with the teachings of FIGURE 1.

Other alternative embodiments could include variations in the coil geometries such as including a number of small coils alternately connected and 180° out of phase, inductively coupled to a second set of series connected coils to enhance the sensitivity of the device. Another variation could provide torsional movement of the input coil. Furthermore, the input circuit compartment 36 as shown in FIGURE 1 has been included in the same shield can 10 as the amplifier components 12. It is obvious that the input circuit could also be in a separate environment and suitably shielded.

The foregoing detailed description has been given for clearness of understanding only, and no unnecessary limitations should be understood therefrom, as modifications will be obvious to those skilled in the art.

What is claimed is:

1. A superconducting amplifier for transforming a low level input signal into an amplified alternating output signal, said amplifier comprising:

a housing;

a pair of coaxially wound coils each formed of superconducting wire, and including;

means in said coils for reducing the susceptibility of said coils to residual magnetic fields transverse and axial to said coils, said means including;

Mounting means for fixedly mounting one of said coils to said housing, and movable support means for movably supporting the other coil immediately adjacent said fixed coil in close inductive coupling therewith;

means for applying said low level input signal to one of said coils; and vibrating means connected to said movable support means for moving said movable coil relative to said fixed coil and varying the inductive coupling therebetween to provide an amplified alternating output signal in the other coil having an amplitude corresponding to the level of said input signal, said combination enabling the amplification of signals having amplitudes in the picovolt region.

2. A superconducting amplifier according to claim 1, wherein said movable coil is centrally disposed concentric to said fixed coil, said movable coil connected to said low level input signal and formed of very fine wire to minimize the volume occupied by said coil, thereby reducing the susceptibility of said coils to residual magnetic fields along the axis of said coils.

3. A superconducting amplifier according to claim 1, wherein said vibrating means for moving said movable coil relative to said fixed coil comprises a member secured to said movable coil and oscillating means coupled to said member to vibrate said movable coil longitudinally relative to said fixed coil.

4. A superconducting amplifier according to claim 1, wherein said vibrating means for moving said movable coil includes an electromechanical transducer having one of said coils mounted thereto and adapted for movement within the inductively coupled region of said coils, and means for operating said electromechanical transducer to vary said inductive coupling.

5. A superconducting amplifier according to claim 4, wherein said electromechanical transducer comprises a bimorph formed of piezoelectric material.

6. A superconducting amplifier for transforming a low level input signal into an amplified alternating output signal, said amplifier comprising:

a housing;

a pair of coaxially wound coils each formed of superconducting wire, and including;

means in said coils for reducing the susceptibility of said coils to residual magnetic fields transverse and axial to said coils, said means including;

mounting means for fixedly mounting one of said coils to said housing, and movable support means for movably supporting the other coil immediately adjacent said fixed coil in close inductive coupling therewith;

means for applying said low level input signal to one of said coils;

a speaker having a speaker cone and a voice coil supported within said housing, said speaker cone axially aligned with said movable coil and connected to said movable support means; and oscillating signal means connected to said speaker voice coil for vibrating said movable coil in longitudinal displacement relative to said fixed coil and varying the inductive coupling therebetween to provide an amplified alternating output signal in the other coil having an amplitude corresponding to the level of said input signal, said combination enabling the amplification of signals having amplitudes in the picovolt region.

References Cited

UNITED STATES PATENTS

| | | | |
|---|---|---|---|
| 3,263,149 | 7/1966 | Meiklejohn | 307—306 |
| 3,098,189 | 7/1963 | Buchhold | 321—8 |

ROY LAKE, Primary Examiner

DARWIN R. HOSTETTER, Assistant Examiner

U.S. Cl. X.R.

307—88.3, 306; 324—99; 330—4.5, 62